United States Patent

[11] 3,528,382

| [72] | Inventors | Ronald Clark;<br>Ewan Christian Brew Corlett, Basingstoke, England |
|---|---|---|
| [21] | Appl. No. | 756,105 |
| [22] | Filed | Aug. 29, 1968<br>Division of Ser. No. 597,283, Nov. 28, 1966, abandoned. |
| [45] | Patented | Sept. 15, 1970 |
| [73] | Assignee | Hydroconic Limited,<br>Basingstoke, Hampshire, England,<br>a British company |

[54] PROPULSIVE SYSTEMS FOR VESSELS
6 Claims, 5 Drawing Figs.

[52] U.S. Cl. .................................................. 114/162, 115/42

[51] Int. Cl. ............................................. B63h 25/06, B63h 5/16

[50] Field of Search ........................................ 114/166, 162, 167; 170/168; 115/42, 16

[56] References Cited
UNITED STATES PATENTS

| 2,884,890 | 5/1959 | Masta............................ | 115/42 |
| 3,249,083 | 5/1966 | Irgens........................... | 115/12 |

FOREIGN PATENTS

| 1,028,457 | 4/1958 | Germany................... | 114/162 |

Primary Examiner—Andrew H. Farrell
Attorney—Dowell and Dowell

ABSTRACT: A propulsive device for a marine vessel, comprising a screw propeller in combination with a contra-stator having arms or blades that straighten out, at least in part, the screw race produced in the water by the propeller and thereby convert at least some of the rotational energy of the screw race into propulsive effort.

Patented Sept. 15, 1970

PROPULSIVE SYSTEMS FOR VESSELS

This application is a division of application Ser. No. 597,283, filed Nov. 28, 1966 and now abandoned.

This invention relates to the steering and propulsion of marine vessels, especially tugs and towing vessels.

The propulsion nozzle is a thrust augmenting device commonly fitted to screw-propelled vessels with screws operating under conditions of high loading. With such nozzles, steering may be effected by rotating the entire nozzle, which has the disadvantage of increasing the clearance from the screw to the nozzle and thereby reducing thrust; or by a normal rudder system, which has the disadvantage that it gives no steering when going astern; or by a normal rudder at exit of the nozzle for ahead steering and two flanking rudders, one on either side of the propeller shaft forward of the nozzle, for astern.

When a screw propeller operates at high screw loadings, a considerable amount of rotational energy is left in the screw race in the form of rotational movement of the water leaving the screw. This rotation involves a considerable waste of energy.

An object of the invention is to provide a system which will utilize a considerable amount of energy from the rotation of the screw race by restoring it as fore and aft propulsive effort on the vessel.

According to the present invention, a propulsive device for a marine vessel comprises a screw propeller in combination with a contra-stator having arms or blades that straighten out, at least in part, the screw race produced in the water by the propeller and thereby convert at least some of the rotational energy of the screw race into propulsive effort.

The system can be used for any vessel where there is a fairly high screw loading and a considerable amount of rotational energy left in the screw propeller race. In particular the system is intended for use with nozzle-screw propulsive systems but it can be used without such a propulsive nozzle.

Forms of construction in accordance with the invention will now be described by way of example and with reference to the accompanying drawings, in which: FIG. 1 is a perspective diagram of a screw propeller and contra-stator;

Figure 1:
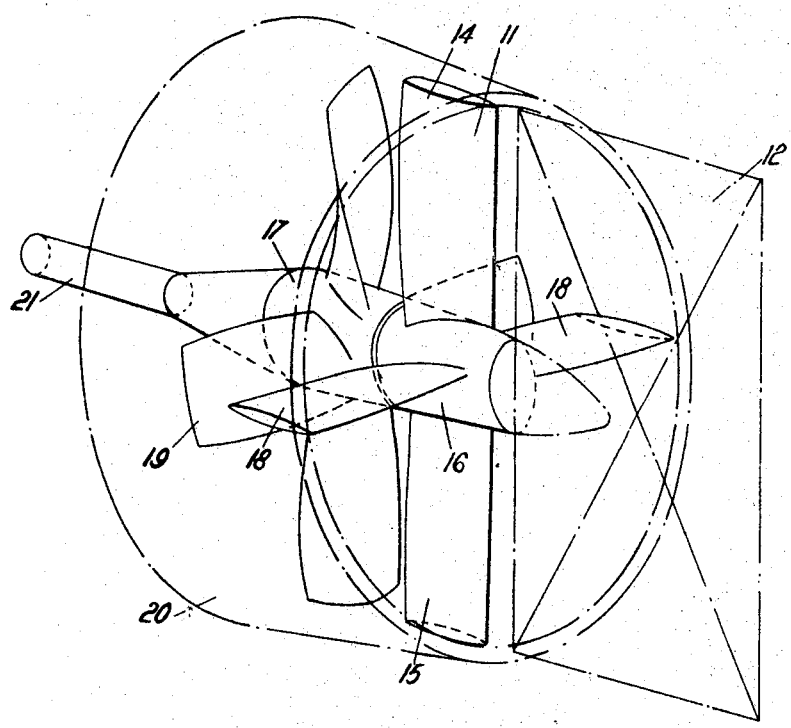
Figure 2:
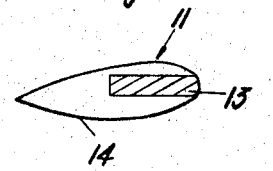
FIGS. 2 and 3 show the cross sections of the upper and lower vertical arms, respectively, of the contra-stator.
Figure 3:
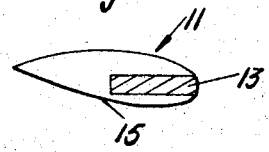
Figure 5:
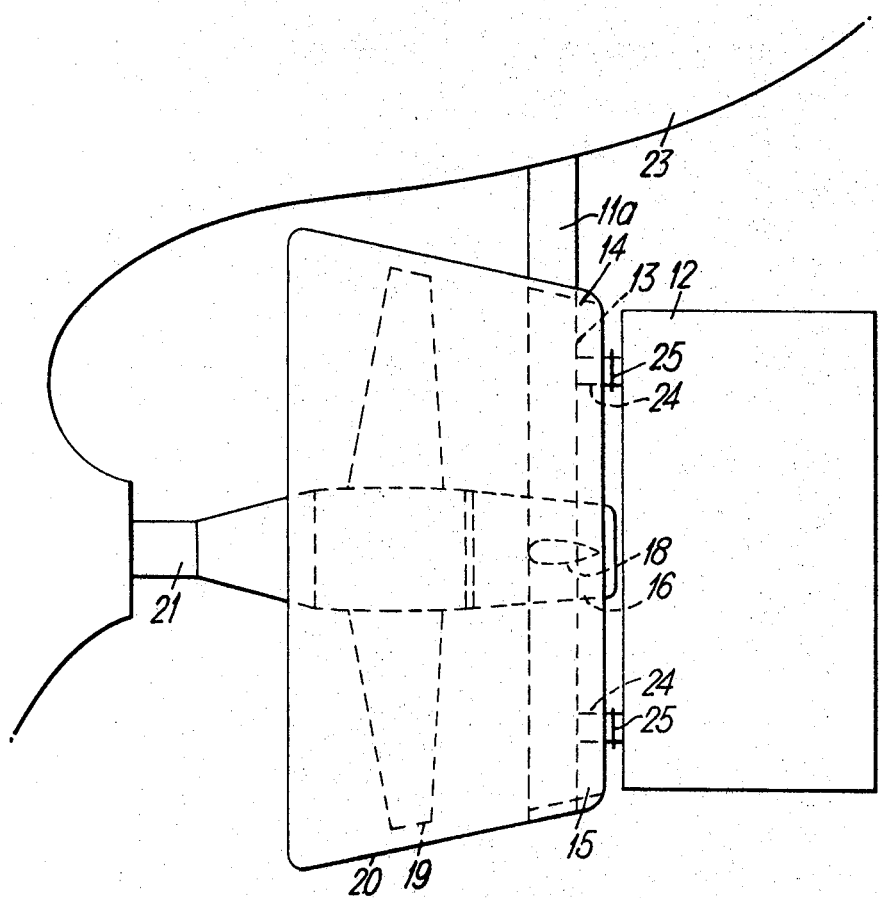
FIG. 5 is a side elevation of the arrangement of FIG. 1.

FIG. 1 shows a vertical rudder post 11 which is angled so as to present its sections at suitable angle of incidence to the screw race, thereby to extract lift from the rotating screw race. The rudder post 11 is arranged as a bulb post in a type of "-bulb rudder", the movable portion of the rudder consisting of a flap 12. The post 11 comprises a vertical bar 13 without twist and having lugs 24 (FIG. 5) on which is hinged, at 25, the rudder flap 12. Fairing plates 14, 15 are attached to the bar 13, as best shown in FIGS. 2 and 3, these fairing plates being of opposite incidence and thereby matched to the incident angle of flow of the screw race. The junction between the two fairings is effected by means of a horizontal axial bulb 16 in way of the propeller boss 17 and from this bulb run two further faired arms 18 extending horizontally. The fairings of the arms 18 are likewise angled to suit the incident flow and the whole forms a contra-stator which tends to counteract rotation of the screw race and in so doing extracts useful energy as hydrodynamic lift on its surface, the forward component of which is added to the propulsive thrust of the screw propeller 19.

The propulsive device may have its after or forward end, or both, installed in a nozzle 20, the vertical member 11 forming the post of the bulb-type rudder as aforesaid while the other members 18 are attached to the nozzle 20. The bar 13 of the rudder post 11 in this arrangement may be used as a main structural member for the support of the nozzle 20 by penetrating through the nozzle, as at 11a in FIG. 5, and into the hull structure 23 of the ship thereby to form an after attachment point for the nozzle itself. The forward end of the bulb 16 at the axial centre of the device may be used as a propeller seating providing a bearing for the aft end of the propeller shaft 21.

The whole device constitutes an effective method of recovering propeller-race rotational energy and the advantage obtained is considerable. It also constitutes a practical and readily constructed structure which integrates the function of rudder, nozzle, contra-propeller and hull attachment in a way that is admirably suited to fabrication in steel.

Figure 4:
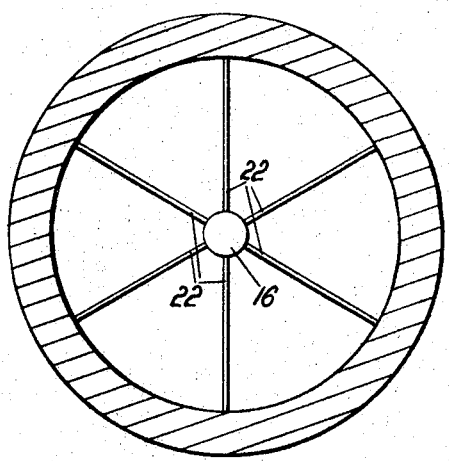
FIG. 4 is a cross section of an alternative six-armed contra-stator.

Other arrangements are possible without departing from the scope of the invention. Thus, FIG. 4 shows an arrangement in which the contra-stator has six equiangularly disposed arms 22, instead of the four arms of FIG. 1.

We claim:

1. A combined propulsive and steering device for a marine vessel, comprising a fixed propulsion nozzle, a screw propeller mounted for rotation within the nozzle, a contra-stator secured fixedly within the aft end of the nozzle aft of said screw propeller and having radiating blades that straighten out, at least in part, the screw race produced in the water by the propeller and thereby convert at least some of the rotational energy of the screw race into propulsive effort, two of said radiating contra-stator blades being vertical and aligned with one another and constituting a rudder post that extends vertically and diametrically across the aft end of the nozzle, and a movable rudder flap immediately aft of the nozzle and hinged on said rudder post.

2. A device according to claim 1, wherein said rudder post comprises a vertical bar without twist to which are attached upper and lower fairing plates of opposite incidence.

3. A device according to claim 1, wherein the contra-stator comprises a plurality of equiangularly-spaced blades radiating from a central bulb disposed in way of the propeller boss.

4. A device according to claim 3, wherein the blades of the contra-stator are arranged in pairs of diametrically opposed blades of opposite incidence.

5. A device according to claim 3, wherein the bulb of the contra-stator provides a bearing for the propeller shaft.

6. A device according to claim 1, wherein the rudder post penetrates upwardly through the nozzle and is secured, externally of the nozzle to the vessel structure thereby to constitute a mounting member for the whole assembly.